June 10, 1969

J. D. BANNING 3,448,644

LIVE CENTER APPARATUS

Filed Nov. 7, 1967

Joe Doyle Banning
INVENTOR.

BY Carl B. Fox, Jr.

ATTORNEY

United States Patent Office 3,448,644
Patented June 10, 1969

3,448,644
LIVE CENTER APPARATUS
Joe Doyle Banning, 7820 Adrian St.,
Houston, Tex. 77012
Filed Nov. 7, 1967, Ser. No. 681,189
Int. Cl. B23b *23/02, 23/04*
U.S. Cl. 82—33          5 Claims

ABSTRACT OF THE DISCLOSURE

The disclosure is of live center apparatus for maintaining a rotating workpiece on true center at the tailstock of a lathe or other rotary apparatus.

Background of the invention

*Field of the invention.*—The field of the invention is that of apparatus for holding a rotating workpiece on true center during rotation thereof in a lathe or other rotary machine. In such apparatus, the workpiece is held between a headstock and a tailstock. The headstock has some means, such as a chuck or clamp for gripping the workpiece centered at its true center or axis. The workpiece is rotated by the headstock, which is equipped with some form of drive motor or engine, suitably connected to the headstock usually by a belt or gear assembly.

The tailstock holds the other end of the workpiece for rotation about its true center or axis of rotation. In some lathes, the tailstock has a so-called "dead center," which does not rotate. The dead center is received into a center hole of the workpiece and the workpiece turns on the fixed dead center.

Particularly in modern machines, the tailstock is provided with a so-called "live center," which rotates with the workpiece. It is the live center apparatus of this type of tailstock with which this invention is concerned.

The center hole of a workpiece is frequently drilled off center. When the center hole is off center and the workpiece is placed in a lathe or other rotary machine, the workpiece will be rotated about some axis which is not its true or intended axis and work done on the workpiece will not be accurate. Apparatus is available for true centering of the headstock end of the workpiece, but apparatus for this purpose at the tailstock has been difficult to adjust, cumbersome, expensive and otherwise generally unsatisfactory.

Summary of the invention

The invention pertains to live center apparatus for lathes and other rotary machines which is simpler, less expensive, and more satisfactory than heretofore available. The live center apparatus provided by this invention is mounted in the conventional tailstock of the lathe or other machine in the usual manner. The live center apparatus includes a fixed body within which a cylindrical sleeve rotates, in bearings, the cylindrical sleeve having therethrough an eccentric passage the axis of which is parallel to and spaced from the axis of the cylindrical sleeve.

A live center shaft, in the form of a cylindrical shaft having an eccentric tip, or center, of conical or other tapered form, is disposed in the eccentric passage of the sleeve, and is adjustable rotationally about its axis, so that its tip may be turned in a circle about the axis of the live center shaft. The eccentricities of the eccentric passage and of the tip are equal, so that the circle of rotation of the tip passes through the true center of the cylindrical sleeve and of the complete live center assembly, and may be placed on center or off center to either side of the true on center position.

If the center hole of the workpiece is off center, the workpiece is positional in true aligned position in the machine, and the tip of the live center is placed off center as described, to register with the center hole of the workpiece. When the headstock is rotated to turn the workpiece, the live center shaft and the cylindrical sleeve rotate together in the fixed body, but the live center shaft does not rotate in the eccentric passage of the cylindrical sleeve, and the tip moves with the workpiece in a circle about the true axis of rotation. Even though the live center shaft is free to turn in the eccentric passage, it does not do so, and maintains its initial eccentricity throughout the performance of work on the workpiece, so that the workpiece rotates about its true axis and accurate work thereon is obtained.

It will be realized that the adjustment of the live center of the tailstock has been simplified and the live center made of lower cost, since no screw or other adjustments are provided for maintaining the live center tip in the correct position, yet the apparatus performs accurately and efficiently.

Description of the preferred embodiment

Figure 1:
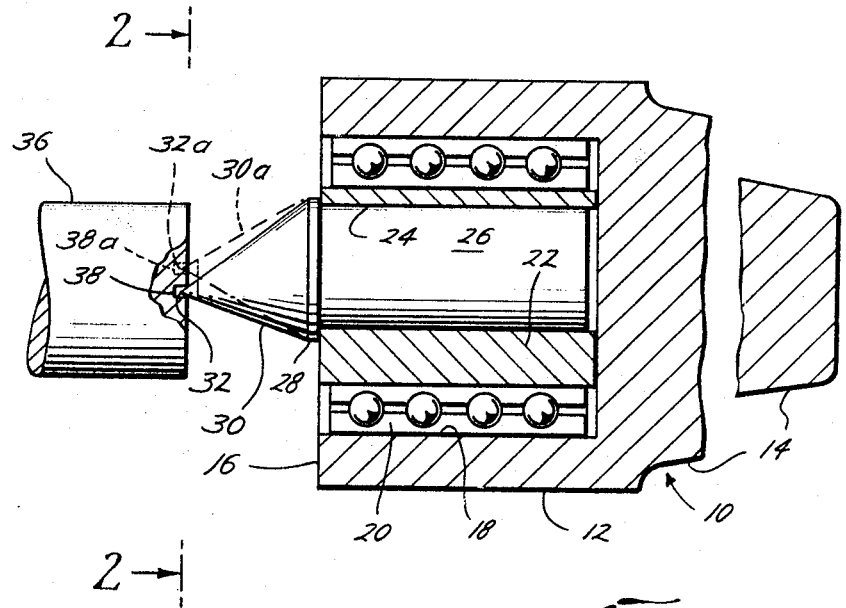
FIG. 1 is a cross sectional view taken along the axis of rotation of a live center apparatus of preferred form according to the invention.

Referring to the drawings, the preferred embodiment of live center apparatus shown therein includes a body or head 10, which is of cylindrical exterior shape at its larger end portion 12, and which is conically tapered at its shank end 14. As the apparatus is used at the tailstock of a lathe, the shank 14 is received into the tailstock opening and clamped rigidly in place.

End portion 12 of body 10 has opening from its end 16 a concentric cylindrical opening 18, which is also concentric with the tailstock of the lathe or other rotary machine. Opening 18 has an antifriction bearing 20 disposed around its curved sides, within which is rotatably disposed an outwardly cylindrical body or sleeve 22, which extends the full depth of opening 18.

Sleeve 22 has therethrough a cylindrical passage 24, the axis of which is parallel with the axis of sleeve 22 but spaced eccentrically therefrom. A live center shaft 26 extends into passage 24 slightly short of the full depth of passage 24, and is enlarged at flange 28 to provide a shoulder. The end 30 of shaft 26 is in the form of a cone the apex or tip 32 of which is eccentric with respect to its circular base at flange 28. The tip 32 formation is in the form of a regular cone, so that it will be centered in a circular centerhole into which it is introduced. Shaft 26 is rotatably movable about its axis in passage 24.

The eccentricity of tip 32 with respect to shaft 26 is preferably the same as the eccentricity of the axis of passage 24 in sleeve 22. When shaft 26 is rotated or turned in passage 24, tip 32 rotates about a circle concentric with the axis of shaft 26. This circle is indicated by a dashed line in FIG. 2, and referred to by reference numeral 34. Tip 32 may be moved to any position around circle 34, by rotation of shaft 26 in passage 24.

Figure 2:
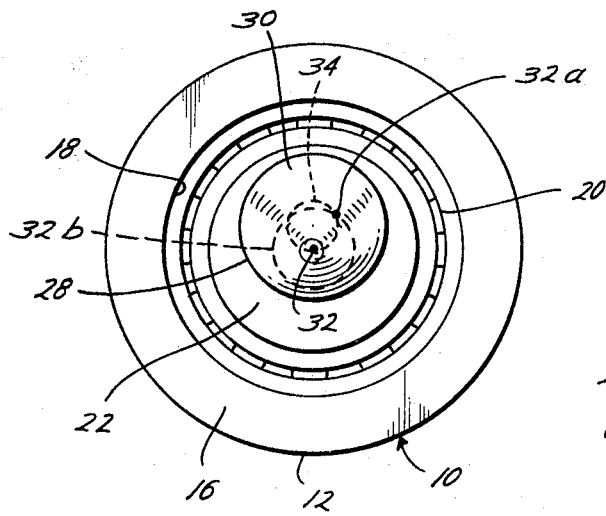
FIG. 2 is an end view of the apparatus shown in FIG. 1, taken as indicated by line 2—2 of FIG. 1.

In FIGS. 1 and 2, tip 32 is shown in a position at the axis of sleeve 22 and of body 10, and, consequently, at the axis or center of the tailstock. But tip 32 may be rotated to any other position or circle 34, for example, to position 32a, indicated in FIGS. 1 and 2, cone 30 then being in position 30a as indicated by dashed lines in FIG. 1. When tip 32 is in position 32a (or any other position on circle 34), it will rotate around a circle 32b, which is concentric around the axis of sleeve 22 and of the tailstock.

Depending on the point on circle 34 to which tip 32 is moved by rotation of shaft 26 in passage 24, tip 32 may be made to rotate about the axis of the tailstock around a circle 32b of any radius from zero up to the diameter of circle 34, upon rotation of sleeve 22 in bearing 20.

The cylindrical end of a workpiece 36 is shown in FIG. 1, to illustrate the manner of operation of the live center. The true center of workpiece 36 is at the center of centerhole 38. An off center, or eccentric, centerhole is indicated at 38a. The workpiece is held on true center at its opposite end by the headstock, and the workpiece is aligned properly over its full length from the headstock to the tailstock. The tailstock is movable to adjust to the length of the workpiece.

The live center tip 32 is placed in the centerhole 38, with the tip 32 firmly engaged with, but not under pressure against, the workpiece. When the lathe is started in operation, the driven headstock rotates the workpiece. Shaft 26 moves with the workpiece, and sleeve 22 rotates with the workpiece.

If the centerhole of the workpiece is at true center, then tip 32 will be in its position 32, and will turn at the center point, without moving in a circle about the axis of the tailstock.

But if the centerhole of the workpiece is at an off center position 32a, which may be off center by any amount, up to the diameter of circle 24, the tip 32 will turn about a circle 32b concentric about the true center, and will thus enable the workpiece to rotate about its true axis of rotation despite the fact of the centerhole being off center. As stated above, the shaft 26 and sleeve 22 rotate with the workpiece, the body 10 being held stationary.

If desired, the tip 32 may be formed consistent with the sides of cone 30, and not of regular cone formation as described. Also, a bearing may be provided about shaft 26 in passage 24 if desired.

The eccentricities of elements 32 and 24 may be up to about the radius of shaft 26, as convenient or as desired. In theory, the eccentricity may be greater than the radius of shaft 26, but this results in a cantilever force on the shaft and undue strain on the apparatus.

While a preferred form of apparatus according to the invention has been shown and described, many modifications thereof may be made by a person skilled in the art without departing from the spirit of the invention, and it is intended to protect by Letters Patent all forms of the invention falling within the scope of the following claims.

I claim:

1. Live center apparatus, comprising first body means adapted to be held fixed in a machine tool, second body means rotatably supported by said first body means, shaft means rotatably supported by said second body means eccentrically of and parallel to the axis of rotation of said second body means, said shaft means having extending tip means eccentric with respect to the axis of rotation of said shaft means, said eccentricity of said tip being equal to the eccentricity of said shaft means, whereby said tip may be rotated to any position on a tip circle intersecting the axis of rotation of said second body means, and whereby when said tip is engaged with a workpiece disposed for rotation by the machine tool about the axis of rotation of said second body means said shaft means and said second body means rotate with said workpiece and said tip rotates at said axis of rotation of said second body means if engaged with said workpiece at the intersection of the tip circle with said axis of rotation of said second body means and moves about a concentric circle around said axis of rotation of said second body means if engaged with said workpiece at another point of said tip circle.

2. The combination of claim 1, said first body means having a cylindrical opening concentric with said axis of rotation of said second body means and said second body means being cylindrical and being rotatably supported within said opening, said second body means having a cylindrical passage the axis of which is parallel to and spaced from said axis of rotation of said second body means by the amount of said eccentricity and said shaft means being cylindrical and being rotatably supported within said passage, said shaft means having at an end thereof extending from said passage a concentric circular enlargement terminating outwardly in a conical point the base of which is formed at said enlargement and the apex of which, which forms said tip, is eccentric to the aixs of rotation of said shaft by the amount of said eccentricity.

3. The combination of claim 2, including ring-shaped bearing means disposed in said opening between said first and second body means.

4. The combination of claim 3, said tip being of regular cone formation at the apex of said conical point.

5. The combination of claim 4, said first body means having spindle means of circular cross sections coaxially aligned with said opening at the opposite side of said first body means from said opening, said spindle means being adapted for holding by the tailstock of a lathe in alignment with the headstock of the lathe, said workpiece being held between said headstock and tailstock of the lathe with said tip engaged in a centerhole of said workpiece.

References Cited
UNITED STATES PATENTS

| | | | |
|---|---|---|---|
| 2,951,407 | 9/1960 | Olson | 82—33 |
| 3,057,237 | 10/1962 | Becker | 82—33 |

LEONIDAS VLACHOS, *Primary Examiner.*